United States Patent
Zhang

(10) Patent No.: US 10,343,476 B2
(45) Date of Patent: Jul. 9, 2019

(54) GOLF CART FRONT SUSPENSION LIFT KIT

(71) Applicant: Yujie Zhang, Simpsonville, SC (US)

(72) Inventor: Yujie Zhang, Simpsonville, SC (US)

( * ) Notice: Subject to any disclaimer, the term of this patent is extended or adjusted under 35 U.S.C. 154(b) by 119 days.

(21) Appl. No.: 15/617,536

(22) Filed: Jun. 8, 2017

(65) Prior Publication Data

US 2018/0354332 A1    Dec. 13, 2018

(51) Int. Cl.
*B60G 7/00*    (2006.01)
*B60G 15/06*    (2006.01)

(52) U.S. Cl.
CPC .......... *B60G 15/062* (2013.01); *B60G 7/008* (2013.01); *B60G 15/068* (2013.01); *B60G 2202/12* (2013.01); *B60G 2202/24* (2013.01); *B60G 2202/312* (2013.01); *B60G 2204/128* (2013.01); *B60G 2204/129* (2013.01); *B60G 2204/143* (2013.01); *B60G 2204/148* (2013.01); *B60G 2300/124* (2013.01); *B60G 2300/13* (2013.01)

(58) Field of Classification Search
CPC ... B60G 15/068; B60G 2204/148; B60G 3/20
See application file for complete search history.

(56) References Cited

U.S. PATENT DOCUMENTS

| | | | | |
|---|---|---|---|---|
| 2,162,828 A * | 6/1939 | Slack | ............... | B60G 3/20 280/124.141 |
| 2,297,901 A * | 10/1942 | Leighton | ............... | B62D 7/18 280/124.136 |
| 3,115,349 A * | 12/1963 | Lerg | ............... | B60G 3/20 267/219 |
| 4,321,988 A * | 3/1982 | Bich | ............... | B60G 13/006 188/321.11 |
| 4,964,651 A * | 10/1990 | Kubo | ............... | B60G 3/20 280/124.109 |
| 5,467,971 A * | 11/1995 | Hurtubise | ............... | B60G 15/068 188/322.12 |
| 5,597,171 A * | 1/1997 | Lee | ............... | B60G 3/20 280/124.138 |
| 6,102,419 A * | 8/2000 | Chun | ............... | B60G 3/20 180/199 |
| 6,746,032 B2 * | 6/2004 | Seki | ............... | B60G 3/20 280/124.135 |
| 7,322,591 B2 * | 1/2008 | Seki | ............... | B60G 3/20 280/124.106 |
| 7,392,997 B2 | 7/2008 | Sanville et al. | | |
| 7,581,740 B1 | 9/2009 | Stimely | | |
| 7,648,304 B2 * | 1/2010 | Wolf | ............... | B60G 7/008 280/93.512 |
| 8,708,359 B2 * | 4/2014 | Murray | ............... | B60G 3/202 280/124.116 |

(Continued)

FOREIGN PATENT DOCUMENTS

GB          2009682 A  *  6/1979   ............ B60B 35/18
WO  WO-2018130475 A1 *  7/2018   ............ B60G 3/20

Primary Examiner — Nicole T Verley
(74) Attorney, Agent, or Firm — Dority & Manning, P.A.

(57) ABSTRACT

A front suspension lift kit for a golf cart includes a spindle bracket. The spindle bracket is mountable to a swing arm such that the spindle bracket is rotatable on the swing arm. A flange of a coil-over shock extends outwardly from a cylinder of the coil-over shock, and the flange of the coil-over shock is mountable to the spindle bracket such that the flange of the coil-over shock is positioned over a pair of spindle bearings on the spindle bracket.

17 Claims, 4 Drawing Sheets

(56) References Cited

U.S. PATENT DOCUMENTS

| | | | | |
|---|---|---|---|---|
| 8,801,037 B1* | 8/2014 | Inoue | ........................ | B60G 3/06 |
| | | | | 280/124.125 |
| 8,944,465 B2* | 2/2015 | Shinbori | .................. | B60N 2/01 |
| | | | | 280/756 |
| 9,174,505 B2* | 11/2015 | Gerrard | .................... | B60G 3/20 |
| 9,409,457 B2* | 8/2016 | Gielisch | ................. | B60G 3/145 |
| 9,796,235 B2* | 10/2017 | Matayoshi | ........... | B60K 7/0007 |
| 10,065,472 B2* | 9/2018 | Kashani | ............... | B60G 15/068 |
| 2010/0059945 A1* | 3/2010 | Kuwabara | .............. | B60G 7/001 |
| | | | | 280/29 |
| 2013/0056948 A1* | 3/2013 | Kucinski | ................ | B60G 11/16 |
| | | | | 280/124.136 |
| 2015/0061275 A1* | 3/2015 | Deckard | ............. | B60G 21/055 |
| | | | | 280/788 |
| 2017/0015356 A1* | 1/2017 | Weifenbach | ........... | B62D 17/00 |
| 2018/0009281 A1* | 1/2018 | Shi | .......................... | B60G 3/20 |
| 2018/0215223 A1* | 8/2018 | Mailhot | ............... | B60G 21/055 |

* cited by examiner

GOLF CART FRONT SUSPENSION LIFT KIT

FIELD OF THE INVENTION

The present subject matter relates generally to lift kits for golf cart front suspensions.

BACKGROUND OF THE INVENTION

A golf cart generally includes a front suspension that connects the golf cart's frame and front wheels. The front suspension allows relative motion between the frame and front wheels. Thus, the front suspension contributes to the handling and ride quality of the golf cart.

A ride height of the front suspension is generally factory selected, and golf cart manufacturers frequently tune the front suspension for road or golf course conditions. Thus, the factory ride height of many gold carts is lower than preferred by some golf carts users. To increase the golf cart's ride height, a lift kit may be added to supplement or replace the factory front suspension.

Known lift kits have certain drawbacks. For example, certain lift kits require modifying the golf cart's frame. In particular, such lift kits can require drilling, welding or cutting the golf cart's frame, and such modifications can be labor intensive and/or require tools not available to all golf carts users.

Accordingly, a golf cart front suspension lift kit that does not require modifying a frame of the golf cart would be useful.

BRIEF DESCRIPTION OF THE INVENTION

The present subject matter provides a front suspension lift kit for a golf cart that includes a spindle bracket. The spindle bracket is mountable to a swing arm such that the spindle bracket is rotatable on the swing arm. A flange of a coil-over shock extends outwardly from a cylinder of the coil-over shock, and the flange of the coil-over shock is mountable to the spindle bracket such that the flange of the coil-over shock is positioned over a pair of spindle bearings on the spindle bracket. Additional aspects and advantages of the invention will be set forth in part in the following description, or may be apparent from the description, or may be learned through practice of the invention.

In a first exemplary embodiment, a front suspension lift kit for a golf cart includes a frame spacer mountable to a frame of the golf cart. A swing arm is mountable to the frame spacer such that the swing arm is rotatable on the frame spacer. A spindle bracket is mountable to the swing arm such that the spindle bracket is rotatable on the swing arm. The spindle bracket includes a pair of spindle bearings. A coil-over shock includes a cylinder and a flange. The flange of the coil-over shock extends outwardly from the cylinder of the coil-over shock. The flange of the coil-over shock is mountable to the spindle bracket such that the flange of the coil-over shock is positioned over the pair of spindle bearings on the spindle bracket.

In a second exemplary embodiment, a front suspension lift kit for a golf cart includes a frame spacer that is mountable to a frame of the golf cart. A swing arm is mountable to the frame spacer such that the swing arm is rotatable on the frame spacer. A spindle bracket is mountable to the swing arm such that the spindle bracket is rotatable on the swing arm. The spindle bracket includes a pair of spindle bearings. A spindle is mountable to the spindle bracket such that the spindle is rotatable on the pair of spindle bearings. A coil-over shock includes a cylinder and a flange. The flange of the coil-over shock extends outwardly from the cylinder of the coil-over shock. The flange of the coil-over shock is mountable to the spindle bracket such that the flange of the coil-over shock is positioned over the cylinder of the spindle and the pair of spindle bearings on the spindle bracket.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
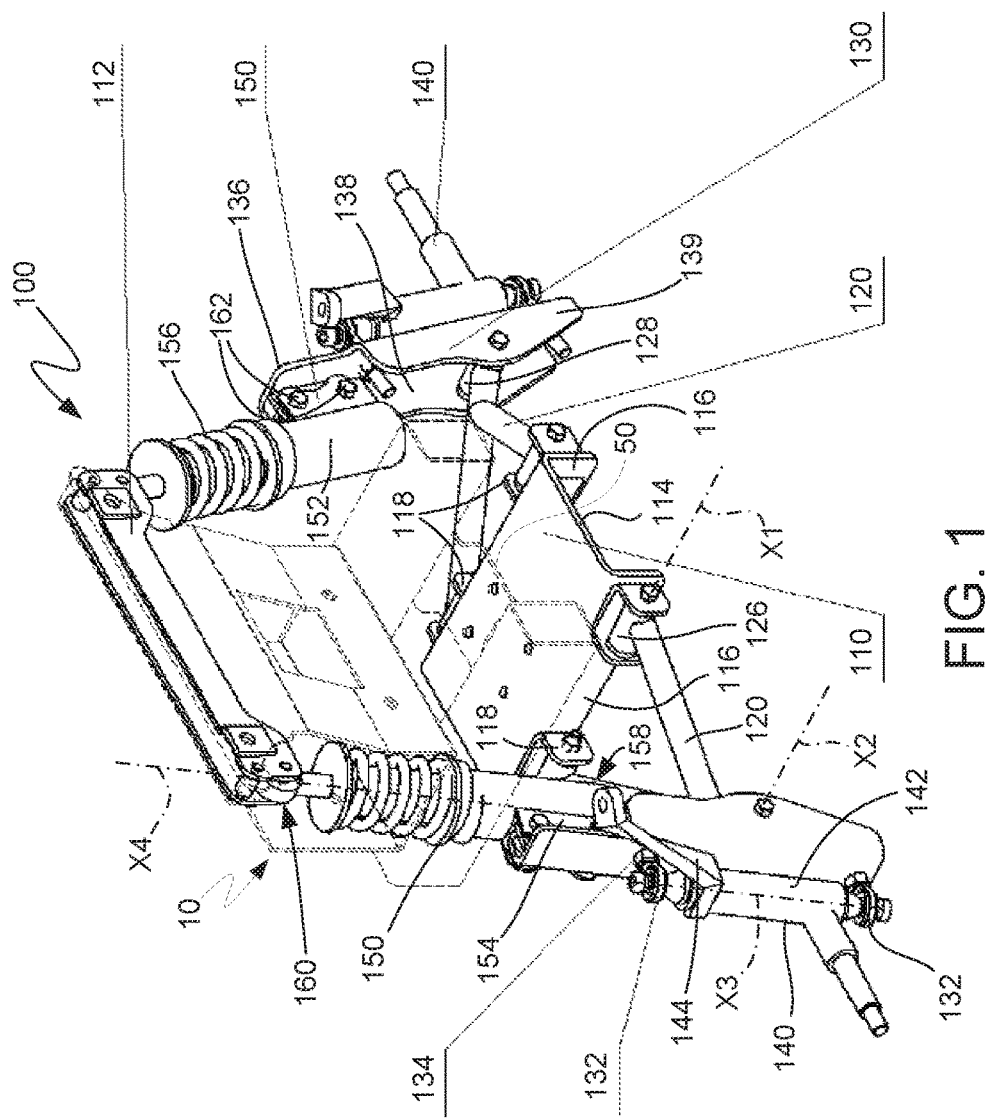
FIG. 1 provides a perspective view of a front suspension lift kit for a golf cart according to a first example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It will be understood that the golf cart front suspension lift kits described herein may be used in or with any suitable golf cart. As an example, the front suspension lift kits described herein may be used in or with a Club Car® Precedent golf cart. Thus, the front suspension lift kits is described in greater detail below in the context of and are illustrated as suitable for use in Club Car® Precedent golf carts. However, the present subject matter is not limited to any particular golf car model, style or arrangement. The use of the term "about" when used in conjunction with a numerical value is intended to refer to within twenty five percent (25%) of the stated numerical value.

Figure 2:
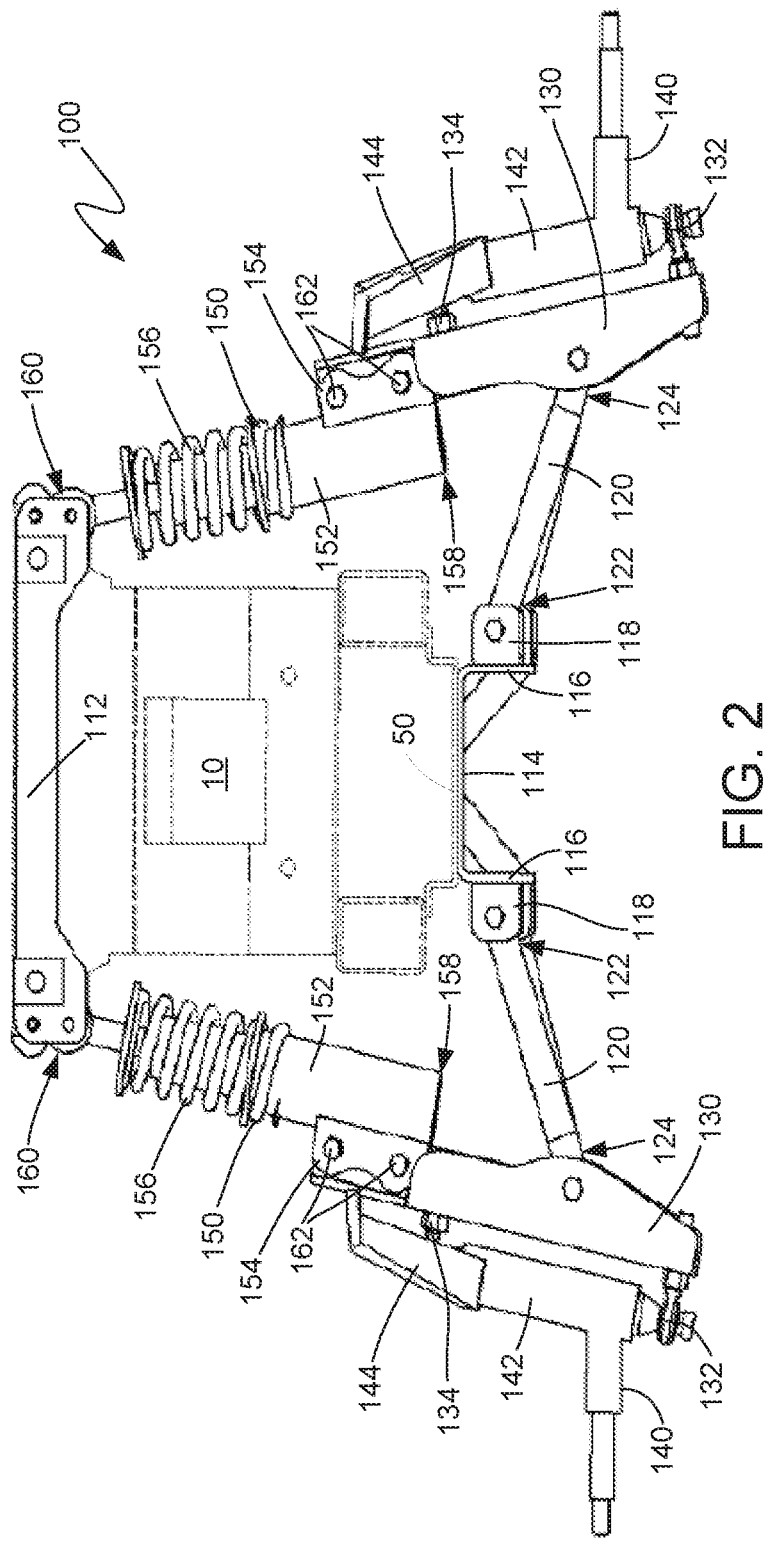
FIG. 2 provides a front, elevation view of the example front suspension lift kit of FIG. 1.
Figure 3:
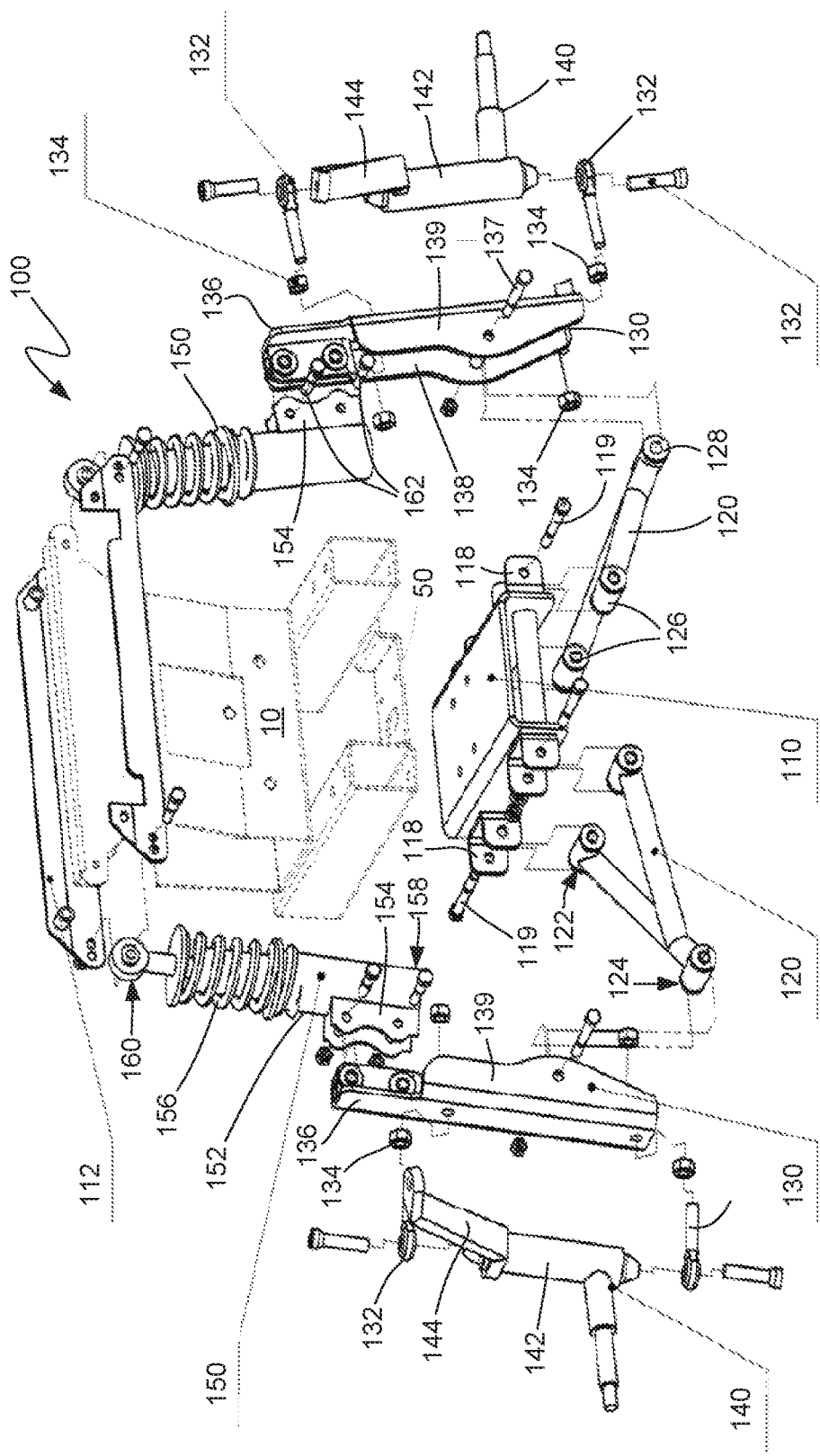
FIG. 3 provides an exploded view of the example front suspension lift kit of FIG. 1.

FIG. 1 provides a perspective view of a front suspension lift kit 100 for a golf cart 10 according to a first example embodiment of the present subject matter. FIG. 2 provides a front, elevation view of front suspension lift kit 100, and FIG. 3 provides an exploded view of front suspension lift kit 100. In FIGS. 1 through 3, components of golf cart 10 are shown in dashed lines while components of front suspension lift kit 100 are shown in solid lines. Components of golf cart 10 may be factory or stock components that front suspension lift kit 100 cooperates with to adjust a ride height of golf cart 10. As may be seen in FIGS. 1 through 3, golf cart 10 includes a frame 50. Thus, frame 50 may be a factory or stock component of golf cart 10 and is not a component of front suspension lift kit 100. As discussed in greater detail below, front suspension lift kit 100 may be mounted to or on the existing components of golf cart 10 to adjust the ride height of golf cart 10.

As may be seen in FIGS. 1 through 3, front suspension lift kit 100 includes a frame riser or frame spacer 110 and a frame bracket 112. Frame spacer 110 includes a base plate 114 and a pair of side plates 116. Side plates 116 are mounted to base plate 114 at opposite sides of base plate 114. Thus, side plates 116 may be spaced from each other on base plate 114. Frame spacer 110 is mountable to frame 50 of golf cart 10. For example, base plate 114 of frame spacer 110 may be mounted to frame 50. In particular, base plate 114 may be fastened to frame 50 with bolts that extend through holes in base plate 114 and through holes in frame 50. The holes in frame 50 may be existing holes, e.g., such that drilling of frame 50 is not required to mount frame spacer 110 on frame 50. When frame spacer 110 is mounted to frame 50, side plates 116 of frame spacer 110 may extend, e.g., downwardly, from base plate 114 of frame 50.

Frame bracket 112 may be similarly mounted to frame 50 of golf cart 10, e.g., using bolts and/or such that drilling of frame 50 is not required to mount frame bracket 112 on frame 50. Frame bracket 112 may be positioned above or over frame spacer 110 when frame bracket 112 is mounted to frame 50 of golf cart 10, e.g., as shown in FIGS. 1 and 2. Thus, frame spacer 110 and frame bracket 112 may be vertically spaced from each other on frame 50 of golf cart 10.

As may be seen in FIGS. 1 through 3, front suspension lift kit 100 also includes an A-arm or swing arm 120, a spindle carrier or spindle bracket 130, a spindle 140 and a coil-over shock 150. For the sake of brevity, only one swing arm 120, spindle bracket 130, spindle 140 and coil-over shock 150 are discussed in detail herein. However, it will be understood that front suspension lift kit 100 includes two swing arms, two spindle brackets, two spindles and two coil-over shocks, e.g., one each for the right and left side of golf cart 10. The description provided below for swing arm 120, spindle bracket 130, spindle 140 and coil-over shock 150 is applicable to each of the two swing arms, the two spindle brackets, the two spindles and the two coil-over shocks of front suspension lift kit 100.

Swing arm 120 extends between a first end portion 122 and a second end portion 124. Thus, first and second end portions 122, 124 of swing arm 120 may be spaced or opposite each other on swing arm 120. Swing arm 120 also includes mounting sleeves. In particular, swing arm 120 includes a pair of frame mounting sleeves 126 and a spindle mounting sleeve 128. Frame mounting sleeves 126 are positioned on swing arm 120 at first end portion 122 of swing arm 120. Conversely, spindle mounting sleeve 128 is positioned on swing arm 120 at second end portion 124 of swing arm 120. Thus, frame mounting sleeves 126 and spindle mounting sleeve 128 may be spaced apart or positioned opposite each other on swing arm 120.

Swing arm 120 is mountable to frame spacer 110 such that swing arm 120 is rotatable on frame spacer 110. To assist with rotatably mounting swing arm 120 on frame spacer 110, frame spacer 110 may include U-brackets 118 that are mounted to or positioned on side plates 116 of frame spacer 110. For example, U-brackets 118 may be welded, fastened, etc. to side plates 116 of frame spacer 110. Two U-brackets 118 may be positioned on and/or mounted to each side plate 116 of frame spacer 110. Thus, frame spacer 110 may include four U-brackets 118 in certain exemplary embodiments.

Swing arm 120 may be mounted to frame spacer 110 with U-brackets 118. In particular, each of frame mounting sleeves 126 may be positioned within a respective one of U-brackets 118, and axles 119 (e.g., bolts) may extend through U-brackets 118 and frame mounting sleeves 126. Swing arm 120 may pivot on axle 119 at the first end portion 122 of swing arm 120, e.g., such that the second end portion 124 of swing arm 120 moves vertically relative to frame spacer 110. Thus, swing arm 120 may have two connection points (U-brackets 118 and frame mounting sleeves 126) to frame spacer 110. As may be seen from the above, frame spacer 110 is mounted to frame 50 of golf cart 10 to provide a connection point for swing arm 120. Thus, e.g., frame spacer 110 may accommodate an increased ride height provided by front suspension lift kit 100 relative to the stock ride height of golf cart 10.

Spindle bracket 130 is mountable to swing arm 120. For example, spindle bracket 130 may be rotatably mounted to swing arm 120. Thus, spindle bracket 130 may be rotatable on swing arm 120. In particular, swing arm 120 may be rotatably mounted to frame spacer 110 and spindle bracket 130 may be rotatably mounted to swing arm 120 such that a rotational axis X1 of swing arm 120 relative to frame spacer 110 is (e.g., about) parallel to a rotational axis X2 of spindle bracket 130 relative to swing arm 120. The rotational axes X1 and X2 may also be angled relative to horizontal by about three degrees (3°), e.g., when the golf cart 10 is on level ground.

As may be seen in FIGS. 1 through 3, spindle bracket 130 includes a pair of spindle bearings 132. Spindle bearings 132 are spaced from each other, e.g., vertically, on spindle bracket 130. Thus, spindle 140 is receivable between spindle bearings 132 on spindle bracket 130. In particular, spindle 140 may be mounted to spindle bracket 130 with spindle bearings 132 such that spindle 140 is rotatable on spindle bearings 132 relative to spindle bracket 130. In particular, spindle bracket 130 may be rotatably mounted to swing arm 120 and spindle 140 may be rotatably mounted on spindle bearings 132 such that the rotational axis X2 of spindle bracket 130 relative to swing arm 120 is (e.g., about) perpendicular to a rotational axis X3 of spindle 140 on spindle bearings 132.

Spindle bracket 130 may include of be formed with a first wall or plate 136, a second wall or plate 138 and a third wall or plate 139. Second and third plates 138, 139 may be mounted to and extend outwardly from first plate 136. For example, second and third plates 138, 139 may be welded to first plate 136 such that second and third plates 138, 139 extend outwardly from first plate 136. Thus, first, second and third plates 136, 138, 139 may be separate pieces of material, such as steel, that are welded together to form spindle bracket 130. As another example, second and third plates 138, 139 may be bent relative to first plate 136 such that second and third plates 138, 139 extend outwardly from first plate 136. Thus, first, second and third plates 136, 138, 139 may be formed from a common, seamless piece of material, such as steel, that is bent, cast, etc. to form spindle bracket 130.

Second and third plates 138, 139 may be positioned parallel to each other. In addition, swing arm 120 may be mounted to spindle bracket 130 at second and third plates 138, 139. In particular, spindle mounting sleeve 128 on second end portion 124 of swing arm 120 may be disposed between second and third plates 138, 139, and an axle 137 (e.g., bolt) may extend through spindle mounting sleeve 128 and second and third plates 138, 139. In such a manner, swing arm 120 may be rotatably mounted to spindle bracket 130. In particular, spindle bracket 130 may translate vertically with swing arm 120, e.g., when second end portion 124 of spring arm 120 translates vertically during pivoting of swing arm 120 on frame spacer 110, and spindle bracket 130 may also pivot relative to swing arm 120, e.g., to allow a wheel (not shown) on spindle 140 to translate and/or pivot.

As discussed above, spindle bearings 132 are configured to support spindle 140. For example, spindle 140 may be mounted to spindle bearings 132 such that spindle 140 extends between spindle bearings 132 on spindle bracket 130. Spindle bearings 132 may be positioned on first plate 136. In particular, spindle bearings 132 may be mounted to first plate 136 with nuts 134. Nuts 134 may be treaded onto spindle bearings 132 and compressed against spindle bracket 130, e.g., where spindle bearings 132 extend through first plate 136, to mount spindle bearings 132 to first plate 136. By adjusting the position of nuts 134 on the treaded portion of spindle bearings 132, a camber of a wheel on spindle 140 may be adjusted. With spindle 140 mounted to spindle bracket 130 with spindle bearings 132, spindle 140 may rotate relative to spindle bracket 130 on spindle bearings 132.

Spindle 140 may include a cylinder 142 and a steering arm 144. Steering arm 144 may extend outwardly from cylinder 142 of spindle 140. Steering arm 144 of spindle 140 is configured for connecting to a tie rod (not shown) of golf cart 10. Thus, e.g., steering arm 144 may be bolted to the tie rod of golf cart 10. Steering arm 144 provides a connection point for the tie rod of golf cart 10. Thus, e.g., spindle 140 and steering arm 144 may accommodate the increased ride height provided by front suspension lift kit 100 relative to the stock ride height of golf cart 10 and allow the existing steering system of golf cart 10 to connect to front suspension lift kit 100.

Coil-over shock 150 includes a cylinder 152, a pair of flanges 154 and a coil 156. Coil-over shock 150 also extends between a first end portion 158 and a second end portion 160. First and second end portions 158, 160 may be spaced apart and positioned opposite each other on coil-over shock 150. Cylinder 152 is positioned at first end portion 158 of coil-over shock 150. Conversely, coil 156 may be positioned at second end portion 160 of coil-over shock 150. Thus, cylinder 152 and coil 156 may be positioned at opposite ends of coil-over shock 150. Cylinder 152 contains a damper, and coil 156 may be a helical spring. Thus, the components of coil-over shock 150 may collectively form a spring-damper system that regulates, e.g., vertical motion of spindle 140.

Flanges 154 of coil-over shock 150 extend outwardly from cylinder 152, e.g., at first end portion 158 of coil-over shock 150. Flanges 154 of coil-over shock 150 are mountable to spindle bracket 130. Thus, flanges 154 provide a connection point between coil-over shock 150 and spindle bracket 130. When flanges 154 are mounted to spindle bracket 130, flanges 154 of coil-over shock 150 may be positioned above or over spindle bearings 132 on spindle bracket 130. Such positioning of spindle bracket 130 relative to coil-over shock 150 may accommodate an increased ride height provided by front suspension lift kit 100 relative to the stock ride height of golf cart 10. In addition, the connection between spindle carrier 130 and coil-over shock 150 may facilitate vibration transfer from spindle 140 to coil-over shock 150.

In certain example embodiments, flanges 154 of coil-over shock 150 may be mountable on second plate 138 of spindle bracket 130. Thus, flanges 154 of coil-over shock 150 may be bolted to second plate 138 of spindle bracket 130, e.g., such that bolts 162 extend through flanges 154 of coil-over shock 150 and through second plate 138 of spindle bracket 130 and/or compress flange 154 of coil-over shock 150 and second plate 138 of spindle bracket 130 together. In particular, flanges 154 of coil-over shock 150 may define holes, and second plate 138 may also defines holes. Each of bolts 162 may extend through a respective hole of flanges 154 and through a respective hole of second plate 138 that are aligned with one another. In such a manner, coil-over shock 150, e.g., first end portion 158 of coil-over shock 150, may be mounted to spindle carrier 130, and the connection between spindle carrier 130 and coil-over shock 150 may facilitate vibration transfer from spindle 140 to coil-over shock 150.

Coil-over shock 150 may also be mounted to frame 50 of golf cart 10. For example, second end portion 160 of coil-over shock 150 may be rotatably mounted to frame bracket 112. In particular, coil-over shock 150 may be connected to frame bracket 112 at second end portion 160 of coil-over shock 150. Frame bracket 112 and/or second end portion 160 of coil-over shock 150 may be positioned above or over cylinder 152 and/or flanges 154 of coil-over shock 150. Thus, e.g., coil-over shock 150 may be generally (e.g., within three degrees) vertically oriented with second end portion 160 of coil-over shock 150 positioned at or adjacent the top of coil-over shock 150 and cylinder 152 and/or flanges 154 of coil-over shock 150 positioned at or adjacent the bottom of coil-over shock 150. A stroke axis X4 of coil-over shock 150 may be (e.g., about) parallel to the rotational axis X3 of spindle 140 on spindle bearings 132. The rotational axis X3 and the stroke axis X4 may also be angled relative to vertical by about three degrees (3°), e.g., when the golf cart 10 is on level ground. Such angling may facilitate vibration transfer from spindle 140 to coil-over shock 150.

Figure 4:
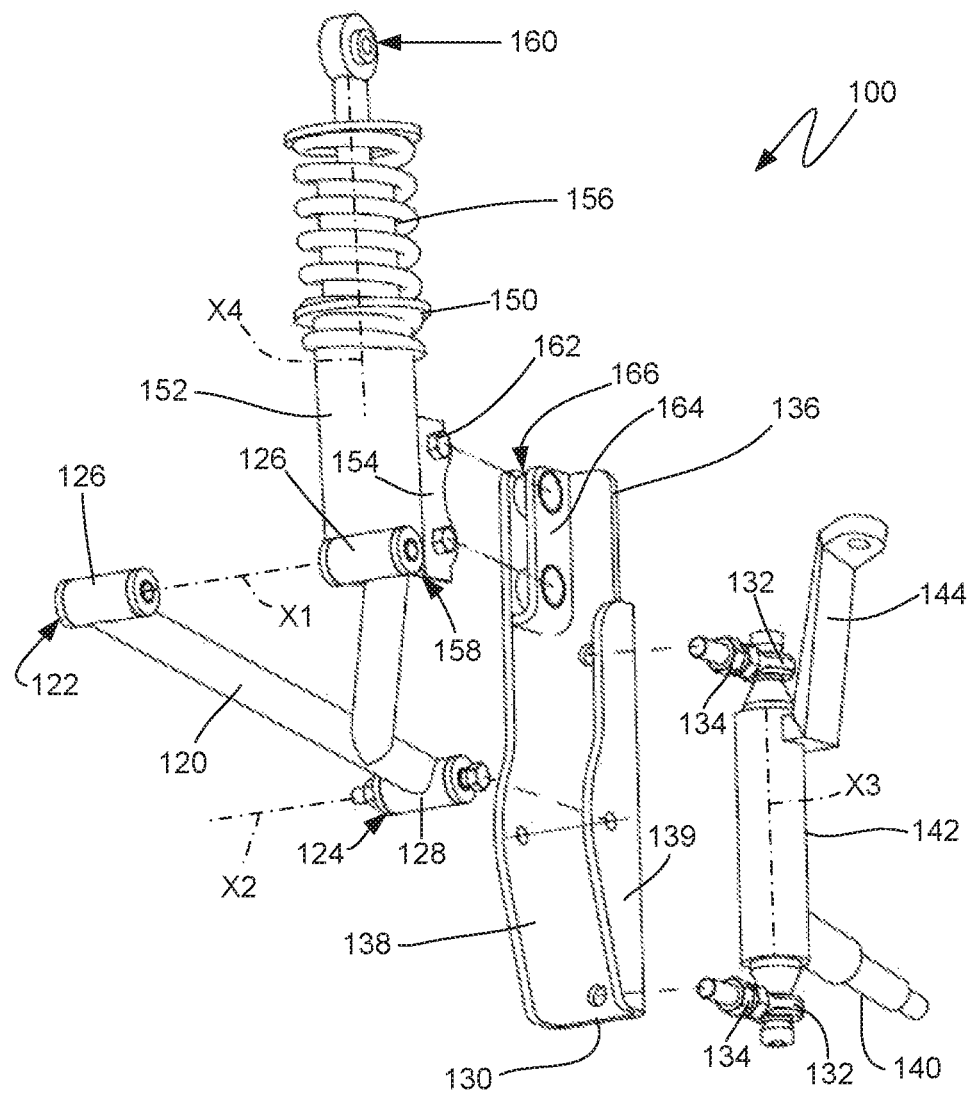
FIG. 4 provides an exploded view of certain components of the example front suspension lift kit of FIG. 1.

FIG. 4 provides an exploded view of certain components of front suspension lift kit 100. As may be seen in FIG. 4, spindle bracket 130 may include pocket plate 164 mounted (e.g., welded) to second plate 138. A pocket 166 may be defined between pocket plate 164 and second plate 138. One of the flanges 154 of coil-over shock 150 may be positioned within pocket 166. Thus, bolts 162 may extend through second plate 138, flanges 154 and pocket plate 164 at pocket 166. Pocket plate 164 may be positioned above or over spindle bearings 132 on spindle bracket 130.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A front suspension lift kit for a golf cart, comprising:
a frame spacer mountable to a frame of the golf cart;
a swing arm mountable to the frame spacer such that the swing arm is rotatable on the frame spacer;

a spindle bracket mountable to the swing arm such that the spindle bracket is rotatable on the swing arm, the spindle bracket comprising a pair of spindle bearings; and a coil-over shock comprising a cylinder and a flange, the flange of the coil-over shock extending outwardly from the cylinder of the coil-over shock, the flange of the coil-over shock mountable to the spindle bracket such that the flange of the coil-over shock is positioned over the pair of spindle bearings on the spindle bracket, wherein the spindle bracket comprises a first plate, a second plate and a third plate, the second and third plates extending outwardly from the first plate, the pair of spindle bearings positioned on the first plate, an end of the swing arm receivable between the second and third plates of the spindle bracket.

2. The front suspension lift kit of claim 1, wherein the flange of the coil-over shock is mountable on the second plate of the spindle bracket.

3. The front suspension lift kit of claim 2, wherein the flange of the coil-over shock defines a hole and the second plate defines a hole, the hole of the flange of the coil-over shock aligned with the hole of the second plate such that a fastener is extendable through both the hole of the flange of the coil-over shock and the hole of the second plate.

4. The front suspension lift kit of claim 1, further comprising a spindle mountable to the spindle bracket such that the spindle is rotatable on the pair of spindle bearings.

5. The front suspension lift kit of claim 4, wherein the spindle comprises a cylinder and a steering arm, the steering arm extending outwardly from the cylinder of the spindle, the steering arm of the spindle configured for connecting to a tie rod of the golf cart.

6. The front suspension lift kit of claim 1, further comprising a frame bracket mountable to the frame of the golf cart above the frame spacer, an end of the coil-over shock rotatably mountable to the frame bracket.

7. The front suspension lift kit of claim 6, wherein the end of the coil-over shock and the flange of the coil-over shock are positioned opposite each other on the coil-over shock.

8. A front suspension lift kit for a golf cart, comprising:
a frame spacer mountable to a frame of the golf cart;
a swing arm mountable to the frame spacer such that the swing arm is rotatable on the frame spacer;
a spindle bracket mountable to the swing arm such that the spindle bracket is rotatable on the swing arm, the spindle bracket comprising a pair of spindle bearings;
a spindle mountable to the spindle bracket such that the spindle is rotatable on the pair of spindle bearings; and
a coil-over shock comprising a cylinder and a flange, the flange of the coil-over shock extending outwardly from the cylinder of the coil-over shock, the flange of the coil-over shock mountable to the spindle bracket such that the flange of the coil-over shock is positioned over the cylinder of the spindle and the pair of spindle bearings on the spindle bracket, wherein the spindle bracket comprises a first plate, a second plate and a third plate, the second and third plates extending outwardly from the first plate, the pair of spindle bearings positioned on the first plate, an end of the swing arm receivable between the second and third plates of the spindle bracket.

9. The front suspension lift kit of claim 8, wherein the flange of the coil-over shock is mountable on the second plate of the spindle bracket.

10. The front suspension lift kit of claim 9, wherein the flange of the coil-over shock defines a hole and the second plate defines a hole, the hole of the flange of the coil-over shock aligned with the hole of the second plate such that a fastener is extendable through both the hole of the flange of the coil-over shock and the hole of the second plate.

11. The front suspension lift kit of claim 8, wherein the steering spindle comprises a cylinder and a steering arm, the steering arm extending outwardly from the cylinder of the spindle, the steering arm of the spindle configured for connecting to a tie rod of the golf cart.

12. The front suspension lift kit of claim 8, further comprising a frame bracket mountable to the frame of the golf cart above the frame spacer, an end of the coil-over shock rotatably mountable to the frame bracket.

13. The front suspension lift kit of claim 12, wherein the end of the coil-over shock and the flange of the coil-over shock are positioned opposite each other on the coil-over shock.

14. The front suspension lift kit of claim 1, wherein the spindle bracket further comprises a pocket plate mounted to the second plate such that a pocket is defined between the pocket plate and the second plate, the flanges of the coil-over shock positionable within the pocket.

15. The front suspension lift kit of claim 1, wherein a spindle rotation axis is defined between the pair of spindle bearings, and the spindle rotation axis is substantially parallel to a stroke axis of the coil-over shock when the flange of the coil-over shock is mounted to the spindle bracket.

16. The front suspension lift kit of claim 8, wherein the spindle bracket further comprises a pocket plate mounted to the second plate such that a pocket is defined between the pocket plate and the second plate, the flanges of the coil-over shock positionable within the pocket.

17. The front suspension lift kit of claim 8, wherein a spindle rotation axis is defined between the pair of spindle bearings, and the spindle rotation axis is substantially parallel to a stroke axis of the coil-over shock when the flange of the coil-over shock is mounted to the spindle bracket.

\* \* \* \* \*